United States Patent [19]

Blaschke

[11] Patent Number: 4,593,240

[45] Date of Patent: Jun. 3, 1986

[54] METHOD AND APPARATUS FOR DETERMINING THE FLUX VECTOR OF A ROTATING-FIELD MACHINE FROM THE STATOR CURRENT AND THE STATOR VOLTAGE, AND THE APPLICATION THEREOF

[75] Inventor: Felix Blaschke, Erlangen, Fed. Rep. of Germany

[73] Assignee: Siemens Aktiengesellschaft, Munich, Fed. Rep. of Germany

[21] Appl. No.: 614,828

[22] Filed: May 29, 1984

[30] Foreign Application Priority Data

May 27, 1983 [DE] Fed. Rep. of Germany ....... 3319350
May 18, 1984 [DE] Fed. Rep. of Germany ....... 3418641

[51] Int. Cl.$^4$ .............................................. H02D 5/40
[52] U.S. Cl. ..................................... 318/800; 318/803; 324/158 AG
[58] Field of Search ............................. 308/800, 803; 324/158 AG

[56] References Cited

U.S. PATENT DOCUMENTS 4,282,473  8/1981  Dreiseitl et al. ................ 318/803
4,388,577  6/1983  Blasche ........................ 318/803
4,475,074 10/1984  Reng .......................... 318/806

Primary Examiner—David Smith, Jr.
Attorney, Agent, or Firm—Kenyon & Kenyon

[57] ABSTRACT

An EMF detector supplies, from the voltage and the current, the EMF vector in a coordinate system fixed in space, the integral of which is the flux vector. The integration is carried out in the field oriented coordinate system, in which the EMF vector is transformed by means of a vector rotator. A rotational component is taken into consideration in the integration by having a first integrator form, from the field parallel EMF component, the magnitude of the flux and having a divider form, from the second EMF component and the magnitude of the flux, the flux frequency, from which frequency an integrator forms simultaneously the flux angle and the angle of rotation for the vector rotator. An angle control input characterizing the steady state and the angle of rotation, through an angle servo control selectably furnishes the field frequency entered into the second integrator to form, from a magnitude servo control, a feedback signal added to the field parallel EMF component. Further provided are circuits for taking into account the stray inductance without differentiation and a circuit for stabilization and damping.

29 Claims, 12 Drawing Figures

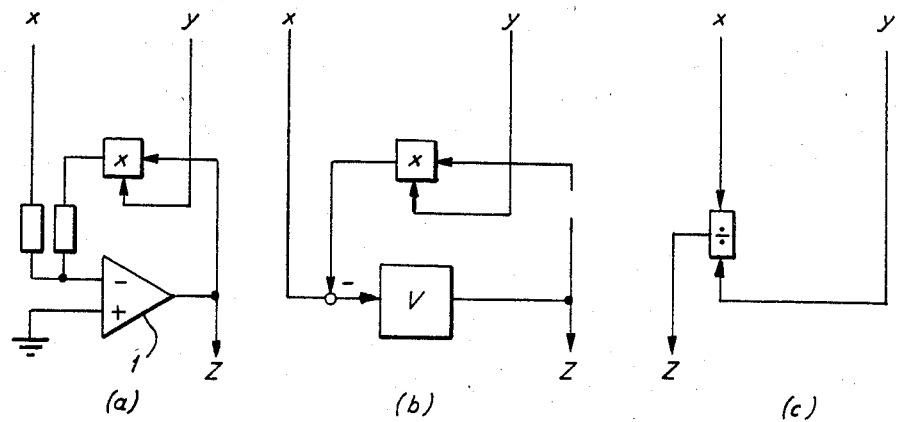
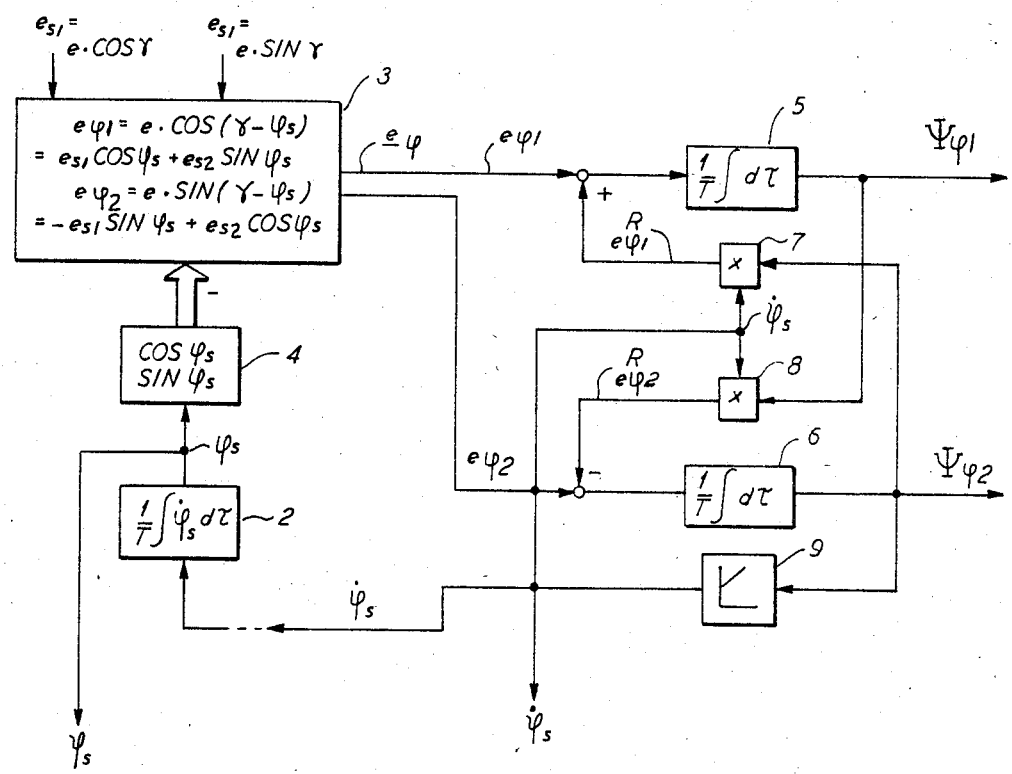
FIG. 1
FIG. 2

METHOD AND APPARATUS FOR DETERMINING THE FLUX VECTOR OF A ROTATING-FIELD MACHINE FROM THE STATOR CURRENT AND THE STATOR VOLTAGE, AND THE APPLICATION THEREOF

BACKGROUND OF THE INVENTION

The invention relates to a method for determining the flux vector of a rotating field machine from the stator current and the stator voltage and the apparatus for implementing the method, as well as to an application of the method and apparatus.

Such a method is used with the apparatus described in German Offenlegungsschrift No. 30 26 202 for the field oriented operation of a rotating field machine fed by a (frequency) converter. For controlling the field orientation, the position of the flux vector is determined and the converter feeding the machine is controlled as a function of the position of the flux vector in such a manner that the component of the stator current parallel to the flux and the stator current component perpendicular thereto can be influenced independently. Through the control of the stator current component parallel to the flux (magnetizing current), a pre-set value for the magnitude of the flux can be adjusted, while the current component perpendicular to the flux (active current) then enters into the torque linearly and can be used directly for the decoupled control of the speed of rotation or the torque.

However, knowledge of the position of the flux vector is necessary for this field orientation. In this connection it is advantageous to measure the flux, not directly via Hall probes, but to calculate it from electrical variables by means of a computer model circuit. The simplest possibility to accomplish this end is a so-called "voltage model" which determines the induced EMF from the input voltages of the motor by subtracting the ohmic stator voltage drop and the inductive leakage voltages. The flux is then obtained as the integral of the EMF.

For describing the machine currents, machine voltages, the EMF and the flux, plane vectors can be used each with two defining variables, for instance, their Cartesian or polar components with respect to a stationary (i.e., stator oriented coordinate system "fixed in space") or one corotating with the rotor shaft ("rotor oriented") or one rotating with the field axis ("field oriented"). For the mentioned "voltage model", consideration in the stator-oriented Cartesian coordinate system is simplest because it is merely necessary, for this purpose, to form, for instance, in a three-phase machine, from the voltages and currents of the three phases mutually shifted 120°, by means of a "3/2" coordinate converter, the corresponding Cartesian components fixed in space such "stator oriented" vector components are characterized here by the subscripts s1 and s2) of the corresponding stator current vector $i_s$ and the stator voltage vector $u_s$. The vector $e_s$ of the EMF is then calculated, taking into consideration the stator resistance $r^s$ and the leakage inductance $\tau$ through addition, component by component, according to $$e_s = u_s - r^s \cdot i_s - \tau \cdot di_s/dt.$$

The stator oriented Cartesian components of the flux vector $\psi_s$ are then obtained as the integral of the corresponding component of the EMF vector. In a coordinate system rotating with the flux vector, with the field-parallel coordinate axis $\phi_1$ and the field-perpendicular coordinate axis $\phi_2$, the EMF vector has the "field oriented" components $e_{\phi 1}$ and $e_{\phi 2}$, in the physical vector relation $\psi = \int e dt$, a rotational component related to the fluxfrequency $\phi'_s$ (i.e., to the derivative of the angle $\phi_s$ between the axes $\phi_1$ and $s_1$) then appears in accordance with $$\psi_{\phi 1} = \int (e_{\phi 1} + \phi' \psi_{\phi 2}) dt$$

$$\psi_{\phi 2} = \int (e_{\phi 2} - \phi' \psi_{\phi 1}) dt$$

The voltage model is therefore always operated as stator oriented

The open integrators required for EMF integration have a tendency to drift and must be stabilized, for instance, via a zero-point control connected into a feedback line. However, the correspondingly slow changes of the flux components are also suppressed at low operating frequencies along with the zero drift. In addition, an angle (phase) error is generated in stationary operation, which has an effect, likewise mainly at low frequencies, and leads to a disturbing misorientation if the reference values for the stator current are given as field oriented. However, these disadvantages are counterbalanced by the good dynamics of this voltage model.

However, it is also possible to determine a model value for the machine flux from the machine currents (i.e., the stator current vector $i_s$ and, in the case of a synchronous machine, also the field current $i^e$) and the measured rotor position $\lambda$ or from the rotor speed $\dot\lambda$, which is frequently advantageous from a measurement point of view. This "current model" simulates the processes occurring in the machine electronically, as far as they lead to the development of the flux. For this current model, the use of a field oriented coordinate system is of advantage, where the rotor time constant is taken into consideration as the time constant of a smoothing member and the current model forms a model flux frequency, from which the flux angle can be formed by integration The conversion from one coordinate system into another coordinate system rotated by a given angle is accomplished by feeding the appropriate components of the vector to be transformed to a so-called "vector rotator", at the phase input of which a corresponding phase signal, for instance, sine and cosine of the angle of rotation, are applied.

In the current model, model parameters as accurate as possible much be set for the machine parameters, so that, for instance, temperature related changes of the rotor resistance lead to falsifications of the model flux in static as well as dynamic processes. For higher operating frequencies, the voltage model is therefore to be perferred, by at low frequencies, the current model leads to a better model value for the flux in spite of possible steady-state inaccuracies.

In the mentioned German Offenlegungsschrift No. 30 26 202.3, a combination of both models is therefore provided. According to the voltage model, there are formed from the machine currents and the machine voltages two components of a model EMF vector $e_s(u)$, from which the corresponding components of the flux vector $\psi_s(u)$ related to this voltage model are formed. The circuit operates here as stator oriented and contains for the formation of the flux one integrator for each Cartesian EMF component. For stabilizing these integrators, a component of this flux vector is impressed on a controller in a feedback line, the output signal of which is impressed as a correction quantity for correcting the corresponding component of the model EMF vector on the integrator input. To the reference input of these controllers is fed the corresponding component of a model flux vector formed by the stator currents and the rotor position λ as the reference input $\psi^*$.

The controllers therefore receive at their inputs the Cartesian components, fixed in space, of the difference vector $\psi_s(u) - \psi^*_s$ and furnish the Cartesian components, fixed in space, of a correction vector; by impressing it on the voltage model, the difference vector is levelled out on the average. Thereby, the voltage model, at least with respect to its stationary behavior, is slaved to the current model, so that the good dynamics of the voltage model is preserved, but the better stationary flux determination of the current model is utilized at low frequencies.

The outputs of the two known correction controls represent the stator oriented Cartesian components of a correction vector, which rotates essentially with the frequency of the vector $\psi_s$. The controllers must therefore continuously process alternating quantities, which may be a disadvantage not only at high operating frequencies but, in particular, this presents difficulties if the method is to be implemented with a microprocessor.

It is therefore an object of the present invention to provide another way of determining the flux vector of a rotating field machine.

SUMMARY OF THE INVENTION

This problem is solved by the method of the present invention. The present invention also starts out from the concept that first, the EMF vector of the rotating field machine is formed by means of an EMF detector from the voltage and the current, which is then modified by a feedback signal derived from the determined flux vector so as to form the flux vector by integration of the modified EMF vector.

According to two basic embodiments, a rotating orthogonal coordinate system is taken as the basis for the modification of the EMF vector, in which the EMF components are processed further. Since ultimately, the one coordinate axis points in the direction of the flux vector, as will be explained later on, the transformed EMF vector therefore has the orthogonal components $e_{\phi 1}$ and $e_{\phi 2}$. The flux vector is now formed by this modified EMF through a special integration procedure.

BRIEF DESCRIPTION OF THE DRAWINGS

FIG. 1a illustrates a operational amplifier with a multiplier in its negative feedback path.

FIG. 1b is a simplification of the circuit of FIG. 1a.

FIG. 1c is a further simplification of what is illustrated in FIGS. 1a and 1b.

FIG. 2 is a block diagram of a circuit for forming a signal which fixes a rotating orthongonal coordinate system and with which an EMF vector determined by an EMF detector in a stator oriented coordinate system is transformed into a rotating coordinate system.

DETAILED DESCRIPTION

Figure 3:
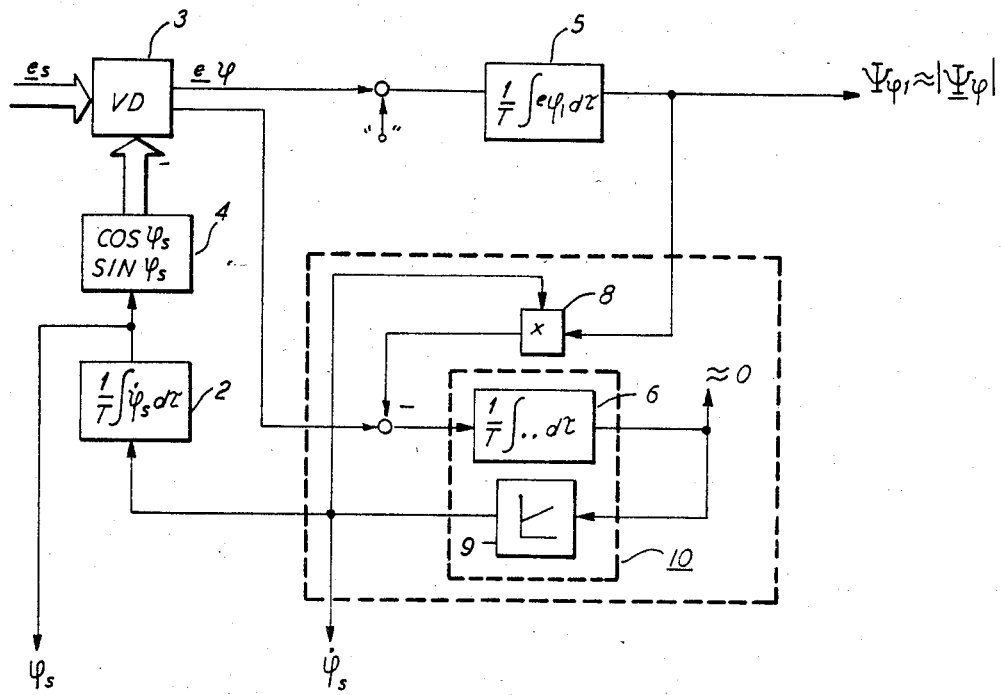
FIG. 3 is a block diagram illustrating a simplification of the system of FIG. 2.

To explain this method, a control loop with an operational amplifier 1 conceived as a very fast acting controller is shown in FIG. 1a, the output variable 2 of which is impressed via a negative feedback loop with gain y on the controller input along with an input x. If the gain of the open integration amplifier 1 is designed as v, the mathematical structure shown next to it in FIG. 1b is obtained for this circuit, to which applies $$(x - y \cdot z) \cdot v = z \text{ or } z = x/(y + 1/v)$$

With sufficient gain, one obtains:

$$\lim_{v \to \infty} z = x/y$$

i.e., ultimately a division, as is also shown in FIG. 1c. FIG. 2 shows a circuit for forming the flux components $\psi_{\phi 1}$ and $\psi_{\phi 2}$ in a reference system rotating with an (initially arbitrary) frequency $\dot{\phi}_s$, where the angle signal $\phi_s$ which determines the respective instananeous angle of rotation between the coordinates fixed in space (axes s1, s2) and the rotating coordinate system ($\phi 1$, $\phi 2$) is formed by a corresponding frequency signal $\dot{\phi}_s$ by means of an integrator 2. By means of this angle $\phi_s$, a vector rotator 3 forms, from the stator oriented EMF components $e_{s1}$ and $e_{s2}$, the transformed components $e_{\phi 1}$ and $e_{\phi 2}$. It is particularly advantageous to form from the angle $\phi_s$ by means of an angle function generator 4 the angle functions cos $\phi_s$ and sin $\phi_s$, i.e., the stator oriented Cartesian components of a corresponding unit vector $\underline{\phi}_s$ and to feed them to the vector rotator 3 as a corresponding pair of rotation angle signals, so that the vector rotator 3 need still only execute a few simple algebraic operations.

To arrive at the flux from the EMF, it is now basically not sufficient only to integrate the transformed components $e_{\phi 1}$ and $e_{\phi 2}$ (integrators 5 and 6); rather, the rotational components $e_{\phi 1}{}^* = \dot{\phi}_s \cdot \psi_{s2}$ and $e_{\phi 2}{}^* = -\dot{\phi}_s \cdot \psi_{s1}$ must be fed to these integrators in accordance with the already mentioned vector relation. FIG. 2 shows the corresponding feedback loops with multipliers 7 and 8.

The rotating coordinate system now becomes field oriented if the coordinate axis $\phi_1$ actually points in the direction of the flux vector. Then, $e_{\phi 1}$ and $e_{\phi 2}$ indicate the field oriented EMF components, and $\psi_{\phi 1} = |\psi_\phi|$ and $\psi_{\phi 2} = 0$ applies. This is achieved if a zero-point controller 9 which must operate very fast, sets in the frequency $\dot\phi_s$ by levelling out the component $\psi_{\phi 2}$. Thus, FIG. 2 indicates how the EMF vector must be integrated in the field oriented coordinate system, taking the rotational components into consideration.

Since, however, the fast controller 9 must always force $\psi_{\phi 2} = 0$ as exactly as possible, the multiplier 7 in FIG. 2 can be omitted. This leads to the circuit shown in FIG. 3, in which a vector given by its Cartesian components is always represented by a double arrow, in accordance with the two signal lines for its Cartesian components.

Figure 4:
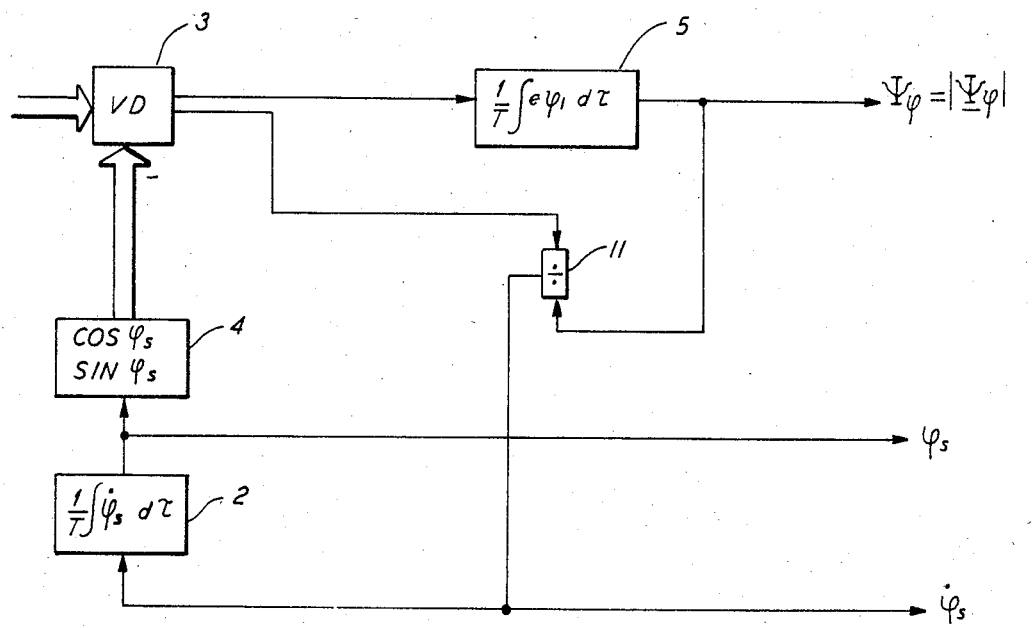
FIG. 4 a block diagram illustrating a further simplification of FIG. 3 utilizing the method of simplification illustrated by FIGS. 1a, 1b and 1c.

For the components taken over from FIG. 2, the same reference symbols have been retained. It can now be seen from this figure that with sufficiently high gain of the subassembly 10 consisting of the integrator 6 and the very fast controller 9, the structure already discussed in FIG. 1 is generated, where the elements 6, 8 and 9 of FIG. 3 or the elements 6 to 9 of FIG. 2 can be replaced by a single divider 11 (FIG. 4).

One thus arrives at a method, in which a signal ($\phi_s$) is formed which fixes a rotating orthogonal coordinate system ($\phi 1$, $\phi 2$) and with which an EMF vector $\underline{e}_s$ determined by an EMF detector in a stator oriented coordinate system is transformed into a rotating coordinate system (vector rotator 3). The field oriented components $e_{\phi 1}$ and $e_{\phi 2}$ of the EMF vector thus represent the modified EMF vector.

The absolute amount $|\psi_\phi|$ of the flux vector is now formed by integration of the first modified EMF component $e_{\phi 1}$ (integrator 5). From the quotient $e_{\phi 2}/\psi$, the frequency of the flux vector is formed (divider 11). By integration of this frequency (integrator 2), the feedback signal $\phi_s$ is obtained, which determines at the same time the angle of rotation of the rotating coordinate system and the direction of the flux vector. Thereby, the stator oriented polar components of the flux vector are already determined.

Figure 5:
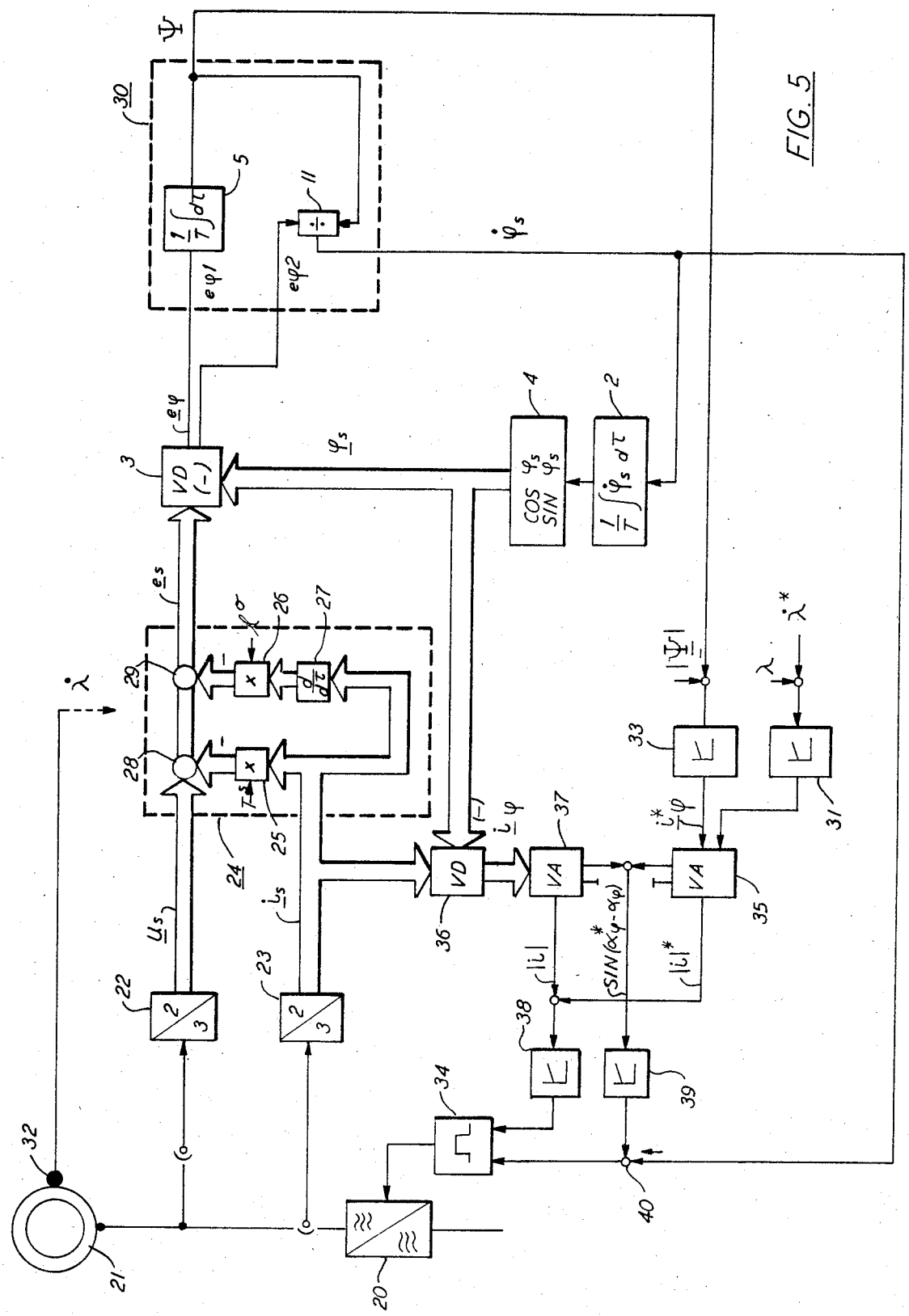
FIG. 5 illustrates how the method illustrated by the block diagram of FIG. 4 can be built into the field oriented control of a rotating field machine fed by a frequency converter.

FIG. 5 now shows how this method can be build into the field oriented control of a rotating field machine 21 fed by a frequency converter 20, in this case, an asynchronous machine. By means of 3/2 coordinate converters 22 and 23, the corresponding stator oriented vectors $\underline{i}_s$ and $\underline{u}_s$ are formed from measured values for the current and the voltage, from which the EMF detector 24 forms the stator oriented vector $\underline{e}_s$.

This is achieved in FIG. 5 by the provision that, by means of multipliers 25 and 26 and a differentiator 27 the vector $r^s \cdot \underline{i}_s$ of the ohmic voltage drop and the vector $l^{\sigma} d\underline{i}_s/dt$ of the leakage voltage drop are formed and are subtracted from the voltage vector at the adding points 28 and 29.

The vector rotator 3, the switching group 30 consisting of the elements 2, 5 and 11 and the angle function generator 4 therefrom form the absolute amount of the flux $|\underline{\psi}_\phi|$ and the stator oriented Cartesian components of the unit vector $\phi_s$ pointing in the direction of the flux vector. In the field oriented coordinate system, $|\underline{\psi}\phi|$ must be set equal to $\psi_\phi 1$ and $\psi_{\phi 2} = 0$; in the stator oriented coordinate system, the polar flux components $|\underline{\psi}\phi| = \psi$ and $\phi_s$ are obtained by multiplication of the unit vector components by the amount $\psi$ of the flux of the stator oriented Cartesian components $\psi_{s1} = \psi \cos \phi_s$ and $\psi_{s2} = \psi \sin \phi_s$ of the vector $\underline{\psi}_s = \psi \cdot \phi_s$.

Thus, the information required about the flux of the rotating field machine for the field oriented operation of the rotating field machine is available. In such a field oriented operation, for instance, a speed control (speed control 31) which controls the speed $\lambda$, i.e., the derivative of the angle of rotation supplied by an angle-of-rotation transmitter 32 to a corresponding reference value $\lambda^*$ can be provided. The output signal of the speed control 31 then supplies the reference value for the torque to be supplied by the machine for maintaining the speed or the active reference current $i_{\phi 2}^*$ proportional thereto. The "active current" is the torque forming component of the stator current which is perpendicular to the flux. The control input for this active current can, of course, also be predetermined by a torque control or regulator or in some other manner.

In FIG. 5, a flux angle control 33 further shows that the flux of the rotating field machine can be controlled to a predetermined reference value $|\psi|^*$. The output signal of this flux control 33 then makes available the control input $i_{\phi 1}^*$ for the "magnetizing current", i.e., the flux parallel component of the stator current. Frequently, however, a flux control is dispensed with and the magnetizing current is preset in accordance with a constant flux in normal operation and a decreasing flux in the weakened field region. The control inputs for the active current and the magnetizing current therefore represent the Cartesian components of the reference stator current in the field oriented coordinate system (vector $\underline{i}_\phi^*$) and it is only necessary to form, from these suitable field oriented control inputs for the stator current which is impressed on the machine via the frequency converter 20 and its control unit 34, using the information regarding the flux angle.

In the embodiment according to FIG. 5, the control unit 34 has two separate inputs for the amount and the direction (phase) of the stator current vector. The control input for the amount of the current can be formed from the field oriented reference vector $\underline{i}_\phi^*$ by means of a vector analyzer 35 which makes available at its magnitude output the reference magnitude $|i|^*$ and at its angle signal output the pair of angle functions $\cos \alpha_\phi^*$, $\sin \alpha_\phi^*$ for the reference angle $\alpha_\phi^*$ between the stator current vector and the axis $\phi_1 = \phi_s$ (flux axis).

This reference current given in the "field oriented" coordinate system can be used as a reference value for current control, to which the corresponding field oriented components of the actual current vector are then to be fed. To this end, a vector rotator 36 transforms the actual current vector $\underline{i}_\phi$ into the field oriented coordinate system by means of the flux angle $\phi_s$ where a subsequent vector analyzer 37 furnishes the actual magnitude $|i|$ and the field oriented current angle $\alpha_\phi$(angle between the flux and the current). By controlling the magnitude of the current determined in this manner (magnitude control 38), the controlled quantity for the magnitude is thereby formed for the control unit 34, while the corresponding angle control 39 pre-sets the frequency control quantity in such a manner that the field oriented current angle $\alpha_\phi$ becomes equal to the corresponding reference value $\alpha_\phi^*$. For this field oriented angle control the angle $\alpha_\phi$, the tangent of the angle or another function of this angle can basically be used; in FIG. 5, the field oriented Cartesian coordinate $\sin \alpha_\phi$ which is present at the vector outputs of the vector analyzers 35 and 37 is used as the actual and the reference value.

FIG. 5 is only an example of a field oriented control, where the control of the current to the reference values pre-set in field orientation is performed in the field oriented cpordinate system, i.e., the actual current values are transformed by means of the vector rotator 36 into the field oriented coordinate system in order to be able to preset d-c quantities into the controllers 38 and 39. In this case, the controller 39 can be relieved considerably by impressing on a subsequent adding point 40 the field frequency in the sense of an anticipatory control.

Figure 6:
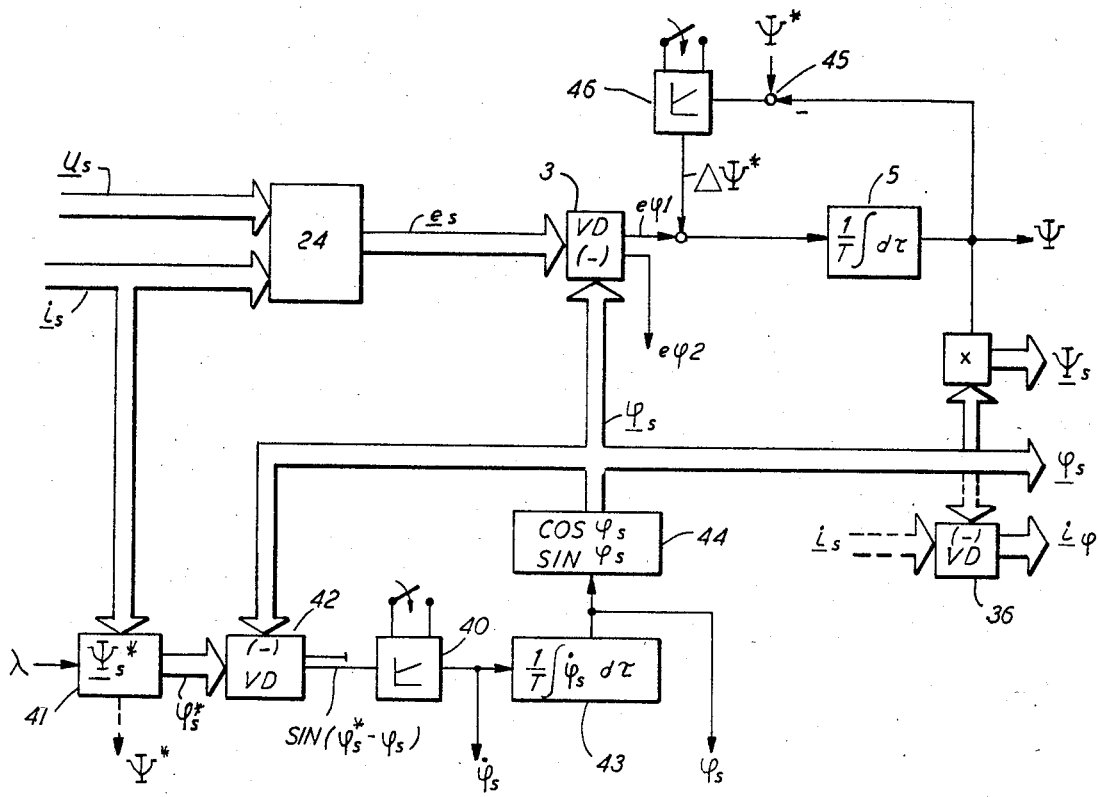
FIG. 6 illustrates a modification of the arrangement of FIG. 5.

Through the field oriented control of the machine, the control of the machine is ultimately determined by the values determined according to the invention, for the flux magnitude $|\psi|$ and the flux angle $\phi_s$. At low frequencies, however, the level of the measured voltage values required for determining the flux is so low that inaccuracies in the determination of the flux can occur. The inaccuracies are noticeable primarily in steady-state operation with low frequencies, while dynamic processes can still be determined by the device relatively accurately. For this reason, an arrangement is shown in FIG. 6, in which the switching of control inputs for the magnitude and angle of the flux is controlled in such a way that stationary errors are largely levelled out but the determination of dynamic processes is retained.

Since therefore, at low frequencies, the flux angle is determined by a control input, in this case the unit vector $\underline{\phi}_s^*$ of a flux control vector $\psi_s^*$, it is sufficient to readjust the angle $\phi_s$ or its unit vector $\underline{\phi}_s$ accordingly by means of a servo control 40. In FIG. 6, for determining the control input $\underline{\phi}_s^*$, a current model 41 fed by the actual current value and the rotor position angle is used and $\underline{\phi}_s^*$ transformed by means of a vector rotator 42 into the field oriented coordinate system. This transformation corresponds to forming an angle difference. Instead of by the current model 41, the control input $\underline{\phi}_s^*$ can also be determined in another manner, for instance, from reference values formed in the field oriented control.

The angle servo control 40 therefore supplies the frequency in such a manner that the direction of the field vector determined corresponds in the average to the direction given by $\phi_s^*$. The field frequency can therefore be taken off at the output of the control 40, while the field direction (i.e., the one coordinate axis of the field oriented coordinate system) is formed by integration (integrator 43) and subsequent information of the angular functions $\cos\phi_s$, $\sin\phi_s$ (function generator 44). It is shown in FIG. 6 that the direction information obtained in this manner can be used, for instance, for the transformation of the stator voltage vector or other quantities from the stator oriented coordinate system into the field oriented coordinate system if the field coordinate control of the machine requires this (vector rotator 36).

Since the angle servo control 40 already furnishes the field oriented direction of the flux vector, the elements 2 and 11, which in FIG. 5 are still necessary for determining this direction, can be omitted in this circuit. However, this leads to the situation that, thereby, the feedback signal derived from the output of the integrator 5 now comes out of engagement and is therefore no longer needed. However, the integrator 5 then still furnishes the integral of the field parallel EMF component, which is mathematically equal to the magnitude of the flux. This error, however, can be regulated out statically by feeding the integrator output to a subtraction point 45 which supplies the control difference for a magnitude servo control 46, to which the magnitude control input $\psi^*$ is fed as the reference value. The output signal of this magnitude servo control 46 is impressed on the input of the integrator 5 together with the field oriented EMF component $e_{\phi 1}$.

Thus, according to FIG. 6, a circuit is arrived at, in which the stator oriented EMF vector $\underline{e}_s$ furnished by the EMF detector 24 is modified such that by means of a signal determining arotating orthogonal coordinate system, the EMF vector $e_s$ is transformed into the rotating coordinate system (vector rotator 3) and the feedback signal $\Delta\psi^*$ (output signal of the magnitude servo control 46) is added to the field parallel component $e_{\phi 1}$ of the transformed EMF vector. The magnitude of the flux vector is then formed by integration of this modified EMF component, and the magnitude feedback signal itself is determined from the control deviation of the magnitude and the magnitude control unit $\psi^*$. From the control deviation of a signal determining the angle of rotation $\phi_s$ of the rotating coordinate system and of a control signal $\phi_s^*$ for the direction of the flux vector, the frequency $\dot{\phi}_s$ of the flux vector and through integration of this frequency, the signal $\underline{\phi}_s$ is formed which determines at the same time the angle of rotation and the direction of the flux vector.

Figure 12:
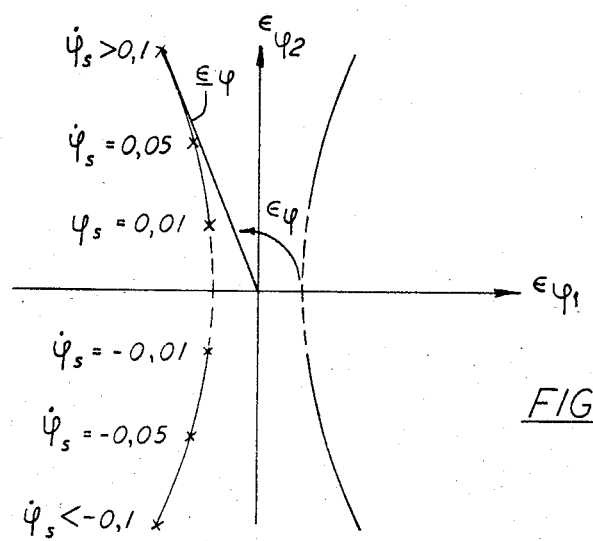
FIG. 12 is a locus curve showing the angle between the correction vector and the flux vector.

In the EMF detector, the formation of the vector $l^\sigma \cdot di_s/dt$ leads to difficulties, because a mathematically exact differentiation of rapidly changing quantities can technically not be carried out. In FIG. 12 and FIG. 13, of German Offenlegungsschrift No. 30 34 275, however, a circuit is shown, in which, through integration of a quantity a and subsequent subtraction of a quantity b with the integration constant t permits calculating a quantity $\bar{c}$ which is given for the case that the quantity $\bar{c}$ is impressed on the integrator input with a negative sign, by:

$$\bar{c}=(a+db/dt)/(1+st)$$

where the time behavior of a smoothing member with the time constant t is designated by $1/(1+st)$.

Figure 7:
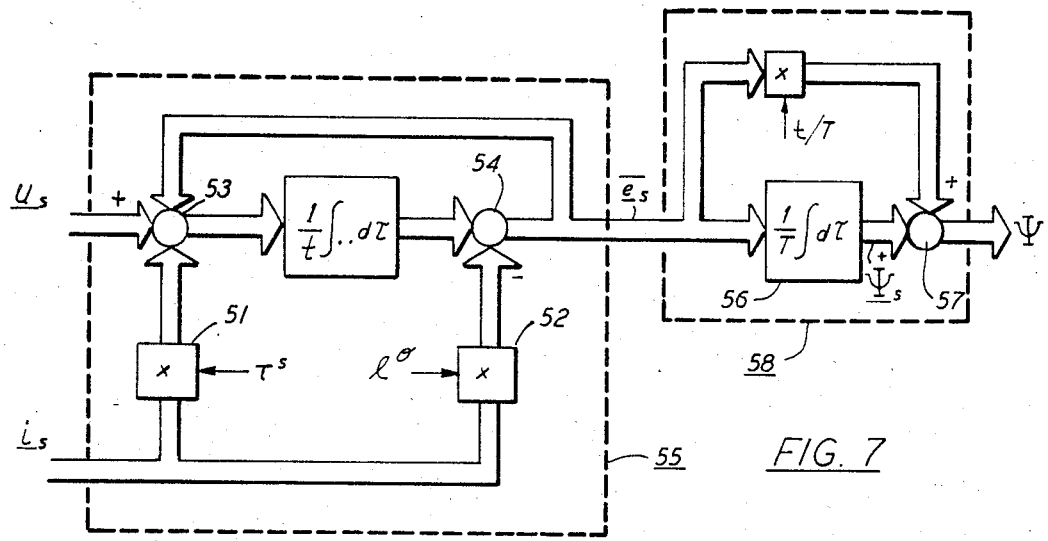
FIG. 7 illustrates further modification of the system of FIG. 5.

By applying this circuit to the components of the vectors $\underline{u}_s$ and $\underline{i}_s$, a circuit is arrived at according to FIG. 7, which, by means of the integrator 50, the multipliers 51 and 52 addressed by the stator resistance parameter $r^s$ and the inductance parameter $l^\sigma$ as well as the subtraction points 53 and 54 allow calculating the vector $$\bar{\underline{e}}_s=(\underline{u}_s-r^s\cdot\underline{i}_s-l^\sigma d\underline{i}_s/dt)/(1+st)$$

which represents the vector of the EMF of the machine, smoothed with the time constant t.

This smoothed EMF vector $\bar{\underline{e}}_s$ is formed by the assembly 55 and now has a time behavior which by itself would falsify the formation of the flux vector as the integral of the EMF vector. However, if this integration is carried out component-wise by integrators 52, on the outputs of which are impressed, at the additional point 57, the components of the smoothed EMF vector, multiplied by the time constant t of the smoothing (or the quotient t/T of the time constant), then a vector $1/t \int \underline{e}_s dt = \underline{\psi}_s/t$ is obtained, i.e., the flux vector of the rotating field machine. The integration time constant T which must be introduced in all integrations for reasons of normalization only has the effect of a proportionality factor, as everywhere in the circuits considered, which does not have to be discussed in detail here.

Figure 8:
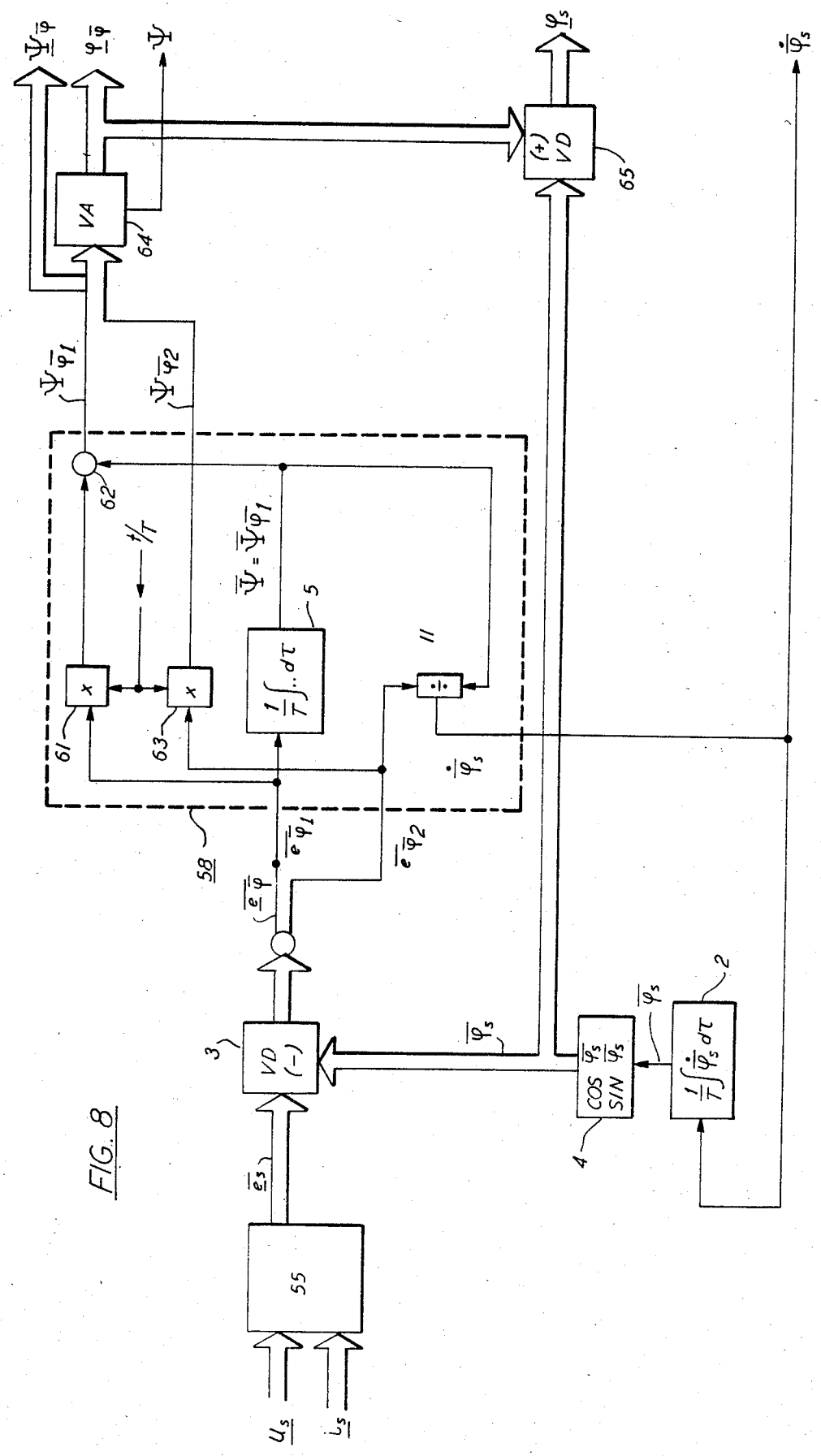
FIG. 8 is a further alternate embodiment of the arrangement of the system of FIG. 5.

The integration in the assembly 58 can also be performed in the manner already described in connection with FIGS. 1 to 4 by transformation of the smoothed EMF vector into the rotating reference system (vector rotator 3) and subsequent integration in this rotating reference system. This is shown in FIG. 8. The angle of rotation required for the transformation at the angle signal input of the vector rotator 3 is formed from the integral of the feedback signal which is the quotient of the divider 11, having as inputs the second component and the integral first component, integrated in integrator 5, of the modified EMF vector taken off at the terminal 60. Since the elements 2 to 5 and 11 form the integral of the vector $\bar{e}_s$, the output signal of the integrator 5 is the magnitude of the smoothed flux vector $\bar{\psi}_s$ belonging to the smoothed EMF. Similarly, the integrator 2 or the function generator 4 furnishes the direction angle $\bar{\phi}_s$ or the corresponding unit vector $\bar{\phi}_s$ of the smoothed flux vector which, for dynamic processes, deviates from the direction $\phi_s$ of the actual (unsmoothed) flux vector due to the smoothing effect of the assembly 55. Therefore, the first rotating EMF component $\bar{e}_{\bar{\phi}1}$ applied to the terminal 60 corresponds to the component perpendicular to the smoothed flux, of the smoothed EMF, while the second component $\bar{e}_{\bar{\phi}2}$ corresponds to the corresponding component, perpendicular to the smoothed flux vector $\bar{\psi}_s$, of the smoothed EMF.

The effect of the smoothing can now be compensated by means of the multiplier 61 and the adding stge 62 in that the quantity $\bar{\psi}$ which is supplied by the integrator 5 and is, as the magnitude of the smoothed flux vector, equal to the component of this vector, parallel to the smoothed flux vector, is added in the amount $t/r \cdot \bar{e}_{\bar{\phi}1}$, i.e., a signal proportional to the smoothing time constant t and the first component ($\bar{e}_{\bar{\phi}1}$) of the modified EMF vector. Thereby, the first component $\psi_{\bar{\phi}1}$ of the flux vector is formed in the coordinate system $\bar{\phi}_1$, $\bar{\phi}_2$. Since the second component of the smoothed flux vector in this coordinate system is zero, the second component of the smoothed flux vector can be taken off directly at the output of the multiplier 63 as a signal which is proportional to the smoothing time constant and the second component $\bar{e}_{\bar{\phi}2}$ of the modified EMF vector.

Due to the direction difference between the smoothed flux vector (angle of rotatation $\bar{\phi}_s$) and the actual flux angle ($\phi_s$), there are therefore available at the output of the assembly 58 the Cartesian components of the actual flux vector, but in a coordinate system oriented to the smoothed flux vector. A vector analyzer 64 can determine therefrom the actual flux magnitude $\psi$ as well as the angle difference between the actual flux vector and the smoothed flux vector, i.e., the angle $\phi_{\bar{\phi}}$ or its Cartesian components $\cos \phi_{\bar{\phi}}$ and $\sin \phi_{\bar{\phi}}$ oriented to the smoothed flux angle. The actual stator oriented flux direction $\phi_s$ is then obtained as the sum of the angles $\phi_{\bar{\phi}} = \bar{\phi}_s$ (vector rotator 65).

If the frequency of the actual flux vector is required, it must be determined from the frequency $\dot{\bar{\phi}}_s$ of the smoothed flux vector and the derivative of the angle $\dot{\phi}_{\bar{\phi}}$. The frequency corresponding to this derivative, however, rarely amounts to more than 0.1% of the smoothed flux frequency. If this frequency is needed, for instance, only for an anticipatory control of an angle control according to FIG. 5 or for the damping circuit explained in the following, this supplemental frequency can be ignored, so that the frequency of the smoothed flux vector can be used as the flux frequency in good approximation.

Figure 9:
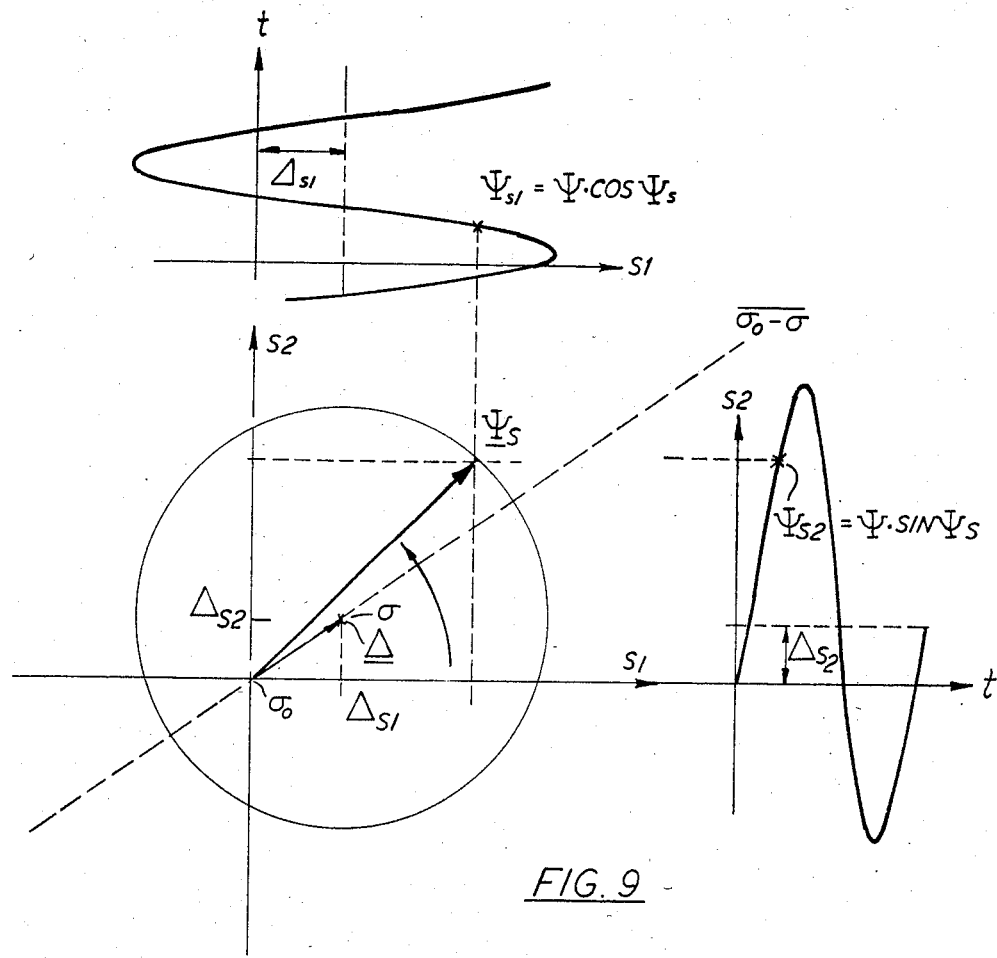
FIG. 9 is a diagram illustrating the locus of the flux vector in a stator oriented coordinate system for the case where the rotating field machine operates at steady-state but the integrators are subject to zero-point shift.

Integrators in general have a tendency for their zero point to drift away and of other integration errors which are noted as disturbing especially at low frequencies (stationary and quasi-stationary states of the rotating field machine). In FIG. 9, the locus of the flux vector $\psi_s$ for the case that the rotating field machine operates steady-state, but the integrators used are subject to a zero-point shift is given in a stator oriented coordinate system s1, s2. The locus curve of the determined flux vector is then eccentric, i.e., the center 0 of the locus curve is shifted relative to the coordinate origin $0_o$ by a vector $\underline{\Delta}$, the "d-c component" of the flux vector. The vector components numerically determined by the circuit are then mixed quantities, in which the sinusoidal motion of the stator oriented Cartesian coordinates of the actual machine flux is superimposed on the respective Cartesian component of the d-c component factor $\underline{\Delta}$. In order to suppress this d-c component in the steady-state case, a correction vector $\delta\psi$ which is derived from the flux vector, is advantageously added to the EMF vector in such a manner that it becomes zero for uniform rotation of the flux vector $\psi_s$ and suppresses during steady-state operation of the rotating field machine a d-c- component in the locus curve of the flux vector fixed in space. The magnitude of the correction vector should therefore be proportional to a "transient quantity" of the flux vector, where a transient quantity is understood to be a magnitude of the flux vector which disappears if the locus curve is centered (uniform rotation).

Such a transient quantity is, for instance, the angular acceleration $\ddot{\phi}_s$ of the flux vector which is positive for positive rotation above the line $\overline{O_o\text{-}O}$ and negative in the half-plane below $\overline{O_o\text{-}O}$. Another preferred transient quantity is the derivative with respect to time $\dot{\psi}$ of the magnitude of the flux, where the sign is the reverse.

If the correction vector is now given a direction which is perpendicular to the direction of the flux itself, then one has for instance, in the field oriented coordinate system:

$$\delta\psi_{\phi 1} = 0, \quad \delta\psi_{\phi 2} = -\dot{\psi}.$$

Figure 10:
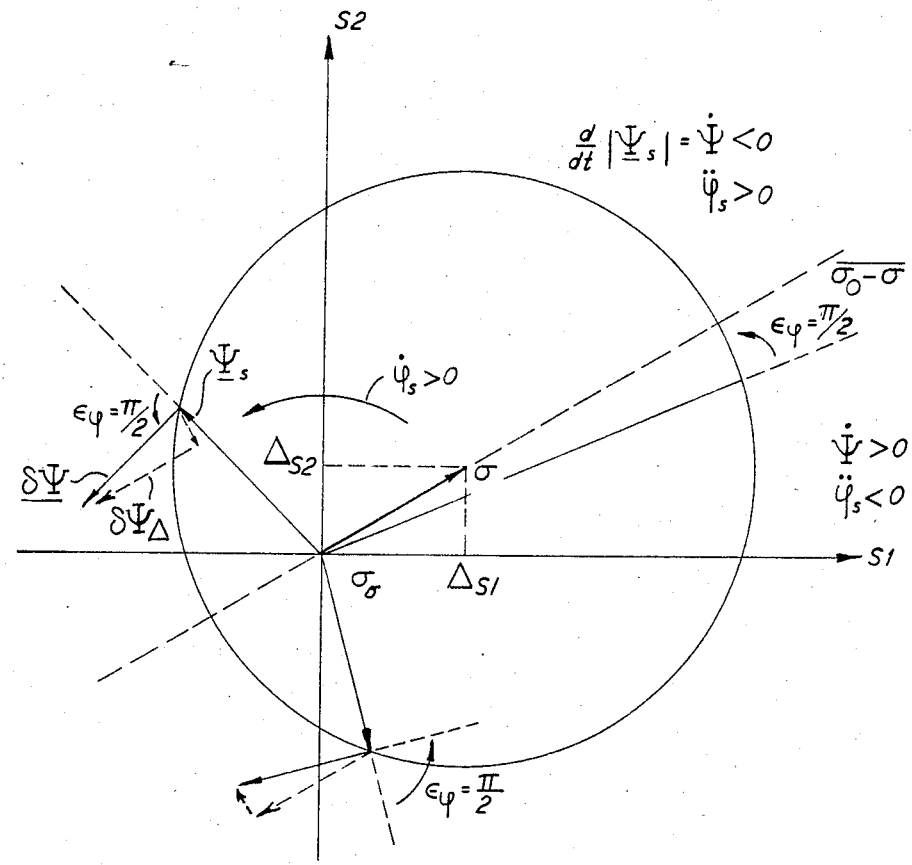
FIG. 10 is a diagram illustrating the averaging of the component of the correction vector perpendicular to the dc component vector in one revolution along the locus curve.

Stator oriented, the picture shown in FIG. 10 is then obtained, in which the correction vector is obtained from the flux vector $\psi_s$ by a rotation by $\epsilon_\phi = +\pi/2$, according to the negative sign of $\dot{\psi}$, i.e., corresponding to the positive sign of $\delta\psi_{\phi 2}$. When going through the straight line $\overline{O_o\text{-}O}$, one has $d\psi/dt = 0$; therefore the correction vector $\delta\psi$ becomes zero for this crossing, and then is rotated relative to the vector $\psi_s$ by the angle $-\epsilon_\phi = -\pi/2$ in the half-plane at the right, bottom, according to the sign reversal by the angle $-\epsilon_\phi = -\pi/2$ relative to the vector $\psi_s$.

As shown in FIG. 10, the component of the correction vector perpendicular to the d-c component vector $\underline{\Delta}$ is averaged out in one revolution along the locus curve, while the component $\delta\psi_\Delta$ parallel to the d-c component vector always has a direction opposed to the d-c component vector.

Figure 11:
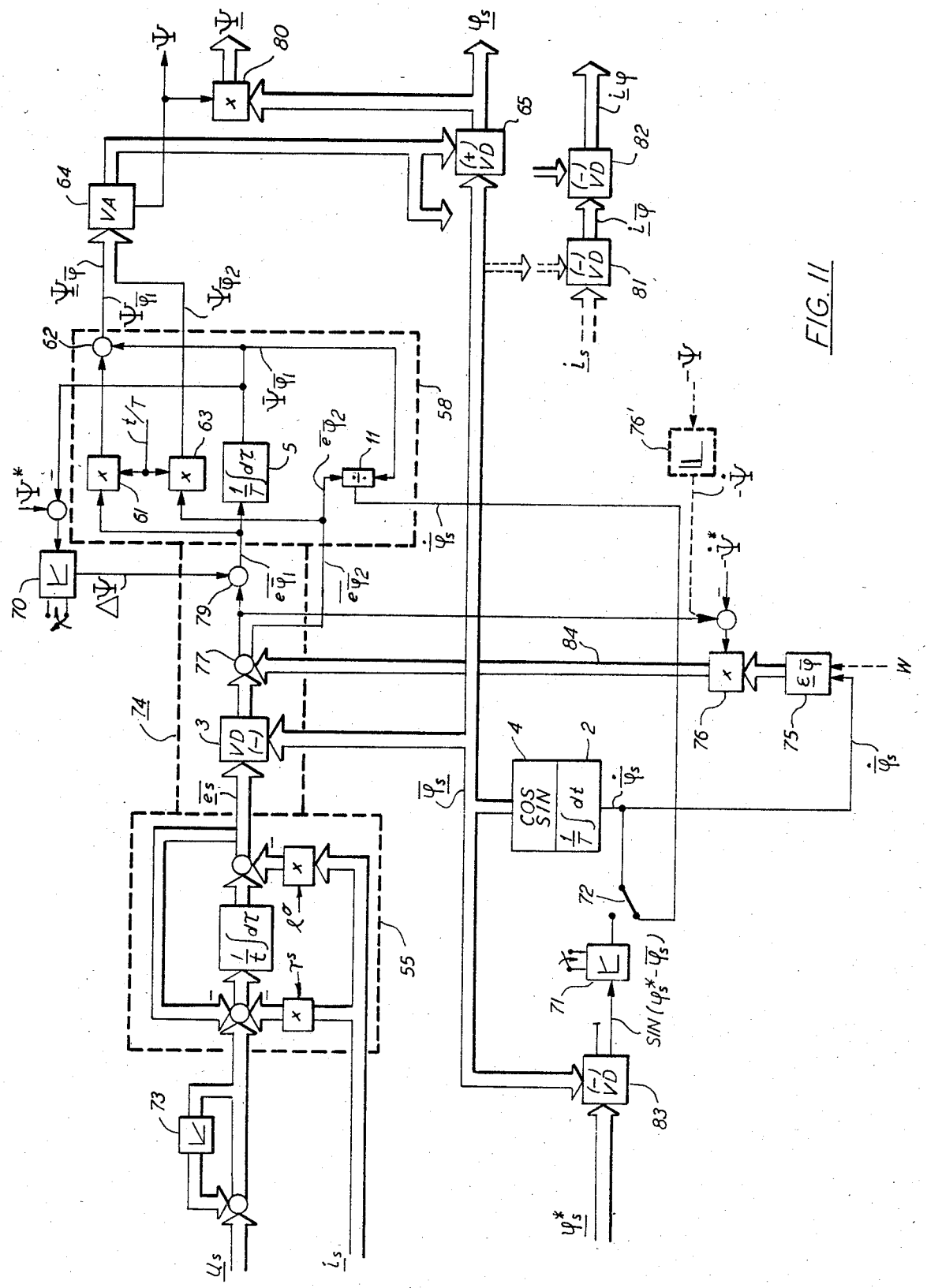
FIG. 11 is a block diagram of a system in which a correction vector is impressed on the vector of the transformed EMF at the input of the circuit provided for the integration in the field oriented coordinate system.

Impressing this correction vector on the vector of the transformed EMF at the input of the circuit provided for the integration in the field oriented coordinate system therefore has the effect that the locus curve of the flux vector obtained by the integration is shifted the more in the direction opposed to the d-c component vector, the larger this d-c component vector is. In the steady-state, however, the correction vector disappears completely and therefore does not lead to a steady-state error averaging of the flux. Such a circuit is shown in FIG. 11.

In this circuit new elements include a magnitude servo control 71 as well as a double-throw switch 72. If the two controllers 70 and 71 are put out of engagement by closing their short-circuit switches, and the double-throw switch 72 is put in the position shown, the configuration explained in FIG. 8 will result. The EMF detector 55, which forms, from measured values of current and voltage, the EMF vector or the smoothed vector $\bar{e}_s$, is preceded by a d-c component control which determines, with relatively low gain, the d-c components in the components of the voltage vector and subtracts them, component by component, from the voltage vector. This d-c component control 73 is designed to be so weak that it causes practically no phase distortion of the voltage vector.

The EMF detector is followed by a computing stage 74 which supplies the modified EMF vector and contains the vector rotator 3 which forms the orthogonal EMF components in a rotating coordinate system which is rotated relative to the stator oriented coordinate system by an angle of rotation $\phi_s$. To the computing stage 74 is connected the integration stage 58, the integrator 5 of which supplies the amount of the flux vector (in this case, initially the magnitude of the smoothed flux vector). The angle of rotation $\bar{\phi}_s$ in turn is supplied by an angle signal former which contains the second integrator 2 as well as also the function generator 4 if pairs of angle functions are always used as angle signals. The input signal of this integrator is the signal $\bar{\phi}_s$ fed back from the integration stage 58, which indicates the frequency of the smoothed flux vector.

The correction vector $\delta\psi$ explained above is supplied by a correction vector generator. In the simple case considered so far, where $\delta\psi$ is perpendicular to the flux vector or the smoothed flux vector and therefore contains only one component $\delta\psi_{\phi 2}$ or $\delta\psi_{\phi 2}$ perpendicular to the flux, the correction vector generator needs to contain only one signal line with a differentiator 76, branching off at the magnitude output of the vector analyzer 64. Also this differentiation is generally superfluous, since the derivative of the flux magnitude essentially agrees with the input signal of the integrator 5 and therefore, the magnitude of the correction vector can be taken off with sufficient accuracy at the corresponding component of the transformed EMF vector or the modified EMF vector, respectively.

Through the correction vector, not only is a d-c component control ultimately achieved, but also a damping of the entire flux determining device. This, however, degrades the dynamics of the flux determination. However, such degradation can be prevented if the magnitude of the correction vector is not determined by $\psi$ alone, but from the difference $\psi-\psi^*$, where $\psi^*$ is a control input for the change of the flux. In particular, $\psi^*$ can be taken off from the current model mentioned at the outset or from the reference values of the rotating field machine control.

It was found further that it is advantageous to pre-set the correction vector not always exactly perpendicular to the flux vector or the smoothed flux vector. Especially at low frequencies it is advantageious if the correction vector also has a component parallel to the flux vector. In FIG. 12, the field oriented locus curve of an advantageious pre-set control vector $\epsilon_\phi$ for the individual given values of the flux frequency $\bar{\phi}_s$ or $\phi_s$ is given.

It is seen therefrom that at frequencies above 0.1, the component perpendicular to the field substantially predominates over the field parallel component. While at low frequencies the angle $\epsilon_\phi$ of approximately 90° is shifted to about $\epsilon_\phi=180°$, the value which belongs to the frequency zero and for which the component perpendicular to the field would disappear completely, is not reached since, here, a singular operating state is involved in which the flux vector no longer rotates but is at rest. If the device is also to serve for determining the flux in the rest condition, impressing of the correction value is disabled.

Entering the angle $\epsilon_\phi$ between the correction vector $\delta_\psi$ and the flux vector by the programmed locus curved according to FIG. 12, means that the correction vector in the rotating coordinate system is based on the control vector $\underline{\epsilon}_\phi$, the magnitude of which is modified by sultiplication with the transient quantity. The correction vector formed thereby thus not only has an angle depending on $\phi$ or $\bar{\phi}$, but its magnitude is proportional to the transient quantity via a proportionality factor likewise dependent on $\phi$ (namely, the function-dependent given magnitude of the control vector).

If the device according to FIG. 11 is used to intervene with the determined flux vector into the control of the rotating field machine, it may turn out to be advantageous to also change this locus curve of the control vector $\underline{\epsilon}_\phi$ in dependence on the operation. In particular, it may be advantageous to change the control vector $\underline{\epsilon}_\phi$ as a function of the load condition, for instance, the angle between the current and the voltage of the rotating field machine, or of another state variable W of the machine.

The engagement via the state variable W can optionally act so that the correction vector, after being averaged over one revolution of the flux vector on the locus curve is no longer antiparallel to the d-c component vector and this d-c component vector is therefore not regulated out correctly, but that nevertheless a stable steady-state operation of the machine is achieved by the interaction with the machine and its control.

The negative branch ($\epsilon_{\phi 2}<0$) in the locus curve according to FIG. 12 relates to the case that the flux revolves in a mathematically negative sense. In this case, the quantity $\psi$ is positive in the left-top half-plane in the eccentric locus curve as per FIG. 10 and negative in the other half-plane, so that here also the same direction of the correction vector is obtained in both half-planes.

The setting of the control vector $\epsilon_\phi$ and $\underline{\epsilon}_\phi$, respectively, corresponding to FIG. 12 can therefore be accomplished in the device according to FIG. 11 by a function memory 75 (PROM) which is addressed by the input signal $\phi_s$ of the second integrator 2 and, if applicable, by the load angle of the rotating field machine or another operating quantity W of the rotating field machine. This control vector can then be multiplied component by component by $-\psi$ or $\overline{e_{\phi 1}}$ or by a difference formed by means of the reference input $\psi^*$ so that it can subsequently be fed to a summing point 77 in the computing circuit 74. In some circumstances, depending on whether operating as a motor or a generator, angles $|\epsilon_\phi|<90°$ are also possible.

As has been explained already, the outputs of the integrating stage 58 represent the Cartesian components of the unsmoothed flux vector oriented to the smoothed flux vector. Conversion of the Cartesian components into polar components or conversion into other coordinate systems presents no difficulties. The vector analyzer 64, for instance, determines the magnitude coordinate $\psi$ and the angle coordinate $\phi_{\overline{\phi}}$ (processed as a unit vector). The vector rotator 65 therefrom forms the stator oriented angle coordinate $\phi_s = \overline{\phi}_s + \phi_{\overline{\phi}}$, and a multiplier 80 can supply from this angle coordinate shown as a unit vector and the magnitude coordinate $\psi$ the stator oriented Cartesian coordinates of the vector $\psi_s$. It is further shown in FIG. 11 that an actual vector or a reference vector (for instance, in a rotating-field machine control according to FIG. 6, the stator current vector $i_s$) can be transformed by means of transformation by the vector rotator 81 driven by $\overline{\phi}_s$ into the $\overline{\phi}$-coordinate system and by means of a vector rotator 82 into the stator oriented coordinate system, and is then processed further later on in the rotating field machine control.

If now the double-throw switch 72 is switched from the position shown into the other position, the configuration of FIG. 6 is obtained, in which the divider 11 is no longer engaged. While the integrator 2, which, however, is now preceded by the angle servo control 71, still acts as an angle former for forming the angle of rotation $\overline{\phi}_s$, it levels out, if it is activated by opening its switch, the angle of rotation $\phi_s^*$ to the reference angle $\overline{\phi}_s$ (which may be given, for instance, by the current model), by changing the frequency $\dot{\phi}_s$ for the angle of rotation $\overline{\phi}_s$ formed by the integrator 2. Since in this arrangement, the angles are used as pairs of angle signals, the angle difference is formed by a vector rotator 83, of which, however, only one component is needed for addressing the angle servo control 71, for instance, the component sin $(\phi_s^* - \overline{\phi}_s)$.

As already explained, in this case the amplitude servo control 70 is also activated by opening its short circuit switch. This control controls the difference $\psi^* - \psi$ in accordance with an amplitude control input $\psi^*$ and the amount of the flux $\psi$ taken off at the output of the integrator 5 by impressing its control output signal on the component $\overline{e}_{\overline{\phi}1}$ of the modified EMF vector.

In this switch position, a smoothing device for the EMF provided according to FIG. 11 and the subsequent correction in the integration stage 58 continue to be in engagement. Likewise, if this is desirable, the damping provided by the correction vector can also remain switched on. This switch position is provided particularly at low frequencies in the rotating field machine. Also, the control inputs determine substantially the determination of the flux. Errors due to the low level of the measured voltage values are not noticeable in the steady-state case while, however, the good dynamics of the voltage model practically remains intact.

The device according to the present invention can be used independently of the control of a rotating field machine to monitor the flux of the rotating field machine for adjustment and control purposes. It can also be used to intervene in the upper frequency range into the control of the machine, but in the lower speed range to idle along in stand-by operation if the machine is then controlled by other means (for instance, by means of a current model). By suitably setting in the reference input $\phi_s^*$, $\psi^*$ and $\psi^*$ it can be achieved that in the lower speed range, in which the low voltage level of the voltage values makes the use of the voltage model more difficult per se, the voltage model is determined in the steady-state by the control inputs (for instance, a current model), while the voltage model measures dynamic deviations from the steady-state dynamically correctly. The transition from the state controlled by the control inputs to the uncontrolled state can be achieved discontinuously by simply switching the switch 72 into the state shown in FIG. 11; however, a continuous transition is also possible, in which the switch 72 is switched alternatively with a frequency-dependent duty cycle.

What is claimed is:

1. In a method for determining the flux vector of a rotating field machine from the stator current and the stator voltage comprising the following steps:
   (a) forming the EMF vector of the machine from measured values of the current and voltage;
   (b) modifying the EMF vector by means of a feedback signal derived from the determined flux vector; and
   (c) forming the flux vector by integration of the modified EMF vector, the improvement comprising, the following steps:
   (d) defining the modified EMF vector with first and second orthogonal EMF components in a rotating coordinate system;
   (e) forming the magnitude of the flux vector by integration of the first rotating EMF component;
   (f) forming the quotient of the second EMF component and the magnitude of the flux vector, said quotient representing the rotational frequency of said flux vector;
   (g) integrating said quotient to form an angle signal representing the angle of rotation of the rotating coordinate system and the angular direction of the flux vector; and
   (h) using said angle signal as the feedback signal for modifying the EMF vector.

2. The method according to claim 1, comprising forming a vector from the measured values of current and voltage which corresponds to a smooth EMF, and transforming the orthogonal EMF components in the rotating coordinate system; integrating the first component of the modified EMF vector; forming a signal proportional to the smoothing time constant times the first component of the modified EMF vector; adding said integrated first component and said signal proportional the first Cartesian component; and forming a signal proportional to the smoothing time constant times the second Cartesian component of the modified EMF vector to form the second Cartesian component of the flux vector in the rotating coordinate system.

3. The method according to claim 1, comprising, deriving a correction vector from the flux vector which, in steady state operation of the rotating field machine, supresses a d-c component in the locus curve of the flux vector fixed in space; and adding said correction vector to the transformed EMF vector.

4. The method according to claim 3, and further comprising setting in to the correction vector a predetermined direction difference relative to the flux vector, and a magnitude which is proportional to a magnitude of the flux vector which disappears when the locus curve is centered.

5. The method according to claim 4, wherein the correction vector is set in in such a manner that its direction is opposed, averaged over one revolution on the locus curve, to the d-c component in the locus curve fixed in space.

6. The method according to claim 4, wherein the magnitude of the correction vector is proportional to a predetermined proportionality factor determined as a function of the frequency of the flux vector and/or a state variable of the rotating field machine, proportional to the derivative of the flux magnitude or proportional to the first orthogonal EMF component of the transformed EMF vector or proportional to the difference of the derivative, or to the first component of the difference of the derivative, or to the first component of the transformed EMF vector and a non-stationary control input.

7. The method according to claim 4, and further comprising adding to the direction of the correction vector a component perpendicular to the flux vector which depends on the frequency of the flux vector and a state variable of the rotating field machine and does not vanish for frequencies other than zero.

8. The method according to claim 7, wherein the component perpendicular to the flux is positive or negative, depending on the sign of the product of the flux frequency and the magnitude of the correction vector.

9. The method according to claim 1, comprising forming a vector from the measured values of current and voltage a vector which corresponds to a smooth EMF; transforming said vector to form the orthogonal EMF components in the rotating coordinate system; integrating the first component of the modified EMF vector; forming a signal proportional to the first component of the modified EMF vector times a smoothing time constant, adding said integrated first component and said signal proportional to form the first Cartesian component, and forming, from a signal proportional to the second component of the modified EMF vector, the second Cartesian component of the flux vector in the rotating coordinate system.

10. The method according to claims 9, and further comprising deriving a correction vector from the flux vector which suppresses a d-c component in the locus curve of the flux vector fixed in space, in steady state operation of the rotating field macine and adding said correction vector to the transformed EMF vector.

11. The method according to claim 10, comprising giving to the correction vector, a predetermined direction difference relative to the flux vector and a magnitude which is proportional to a magnitude of the flux vector which is proportional to a quantity of the flux vector which vanishes if the locus curve is centered.

12. The method according to claim 11, comprising presetting the correction vector in such a manner that, averaged over one revolution on the locus curve, its direction is opposed to the d-c component in the locus curve fixed in space.

13. The method according to claim 11, wherein the magnitude of the correction vector is proportional to a predetermined proportionality factor determined as a function of the frequency of the flux vector and/or a state variable of the rotating field machine proportional to the derivative of the flux magnitude or proportional to the first orthogonal EMF component of the transformed EMF vector or proportional to the difference of the derivative or to the first component of the transformed EMF vector and to a non-stationary control input.

14. The method according to claim 11, comprising presetting a component for the direction of the correction vector, which is perpendicular and which depends on the frequency of the flux vector and in particular on the frequecy of the flux vector and a state variable of the rotating field machine and does not vanish for frequencies different from zero.

15. The method according to claim 14, wherein the component perpendicular to the flux is positive or negative depending on the sign of the product of the flux frequency and the magnitude of the correction vector.

16. The method according to claim 9 or claim 12, wherein the control inputs are formed from reference values of the machine or simulation of the flux from actual values for the current and the rotor position of the machine.

17. Apparatus according to claim 1, wherein said integration stage contains a divider for forming the quotient from the second orthogonal EMF component and the first integration signal, and wherein the output signal of the divider is fed to the input of the second integrator and the second integration signal to an output device for the angle or the Cartesian components of the flux vector.

18. Apparatus according to claim 1, and further including means to form a correction vector for setting in a correction vector which is rotated relative to the flux vector and, in particular, is not parallel to the flux vector, and disappears in the steady state, and means for summing the EMF vector and the correction vector.

19. Apparatus according to claim 18, comprising means for forming a quantity approximately proportional to the derivative of the flux from the first component of the modified EMF vector or the magnitude of the flux vector and magnitude forming means for determining the magnitude of the correction vector.

20. Apparatus according to claim 18 or 19 and further including means forming a control vector acted upon by the frequency of the flux vector or the rotating reference system and preferably also by a quantity characterizing the load condition of the machine, which fixes, in functional dependence on its input quantities, the components of a control vector in the rotating reference system, and a multiplier stage which furnishes the correction vector by multiplication of the control vector by a magnitude determining quantity.

21. Apparatus according to claim 1, wherein means for forming an angle signal includes an angle servo control which is connected ahead of the second integrator and has as an input the difference between the angle of rotation and a control rotation angle for forming the feedback signal; a magnitude servo control acted upon by the first integrator signal and a control amount forming a further feed back signal and said computing stage including an adding stage for summing the further feedback signal and the first orthogonal EMF component.

22. Apparatus according to claim 21, wherein said integration stage contains a divider for forming the quotient from the second orthogonal EMF component and the first integration signal, and wherein the output signal of the divider is fed to the input of the second integrator and the second integration signal to an output device for the angle or the Cartesian components of the flux vector, and further including double-throw switching means for coupling the input of the second integrator selectably or alternatively between the output of the divider and the angle servo control.

23. Apparatus according to claim 1, wherein said EMF detector contains means for forming a smoothed EMF vector which is fed to the computing stage for transformation into the rotating reference system; the first integrator signal and a signal taken off at the computing stage output for the first orthogonal EMF component is proportional to the smoothing time constant form a first Cartesian component of the flux vector in the rotating reference system, and wherein a signal which is taken off at the computing stage output for the second orthogonal EMF component and is proportional to the smoothing time constant provides the second Cartesian component of the flux vector in the rotating reference system.

24. Apparatus according to claim 1 or claim 23, and further including means for transforming the flux vector into the stator oriented coordinate system.

25. Apparatus according to claim 1, and further including a device connected ahead of the voltage input of the EMF detector for suppressing d-c voltages.

26. Apparatus according to claim 1, and further including means for feeding the angle of rotation of the rotating coordinate system to means for the coordinate transformation of actual and/or reference values, and wherein the transformed actual and/or reference vectors of the control device are fed to a converter supplying the stator current of the rotating field machine.

27. Apparatus according to claim 1, in combination with a converter fed rotating field machine, wherein the position of the flux is determined and the converter is controlled in dependence on the determined position of the flux, such that the component parallel to the flux and the component perpendicular thereto of the stator current can be influenced independently.

28. In a method for determining the flux vector of a rotating field machine from the stator current and the stator voltage comprising the following steps:
 (a) forming the EMF vector of the machine from measured values of the current and voltage;
 (b) modifying the EMF vector by mean of a first feedback signal to form a first modified EMF vector having first and second orthogonal components in a rotating coordinate system;
 (c) further modifying the first modified EMF vector to form a second modified EMF vector having a first component equal to the sum of the first orthogonal EMF component of the first modified EMF vector and a second feedback signal and a second component equal to the second orthogonal component of said first modified EMF vector;
 (d) determining the magnitude of the flux vector by integration of the first component of the second modified EMF vector and forming the second feedback signal from the control deviation between said magnitude and a magnitude control input;
 (e) providing a first control signal which determines the angle of rotation of the rotating coordinate system;
 (f) providing a second control signal representing the direction of the flux vector;
 (g) forming a third feedback signal from the control deviation between said first and second control signals, said third feedback signal representing the frequency of the flux vector;
 (h) integrating said third feedback signal to form an angle signal representing the angle of rotation of the rotating coordinate system and the second control signal representing the direction of the flux vector; and
 (i) using said angle signal as the first feedback signal for modifying the EMF vector to form said first modified EMF vector.

29. In an apparatus for determining the flux of a rotating field machine from voltage and current comprising:
 (a) an EMF detector which forms from measured values of the current and voltage an EMF vector;
 (b) a computing stage, having said EMF vectors as an input, forming a modified EMF vector by means of a first feedback signal derived from a flux vector; and
 (c) an integration stage, having said modified EMF vector as an input, forming the flux vector by integration of said modified EMF vector, the improvement comprising:
 (d) the computing stage having an angle input for receiving the first feedback signal and containing means for forming first and second orthogonal EMF components in a rotating coordinate system;
 (e) the integration stage containing, for forming a first integrator signal, a first integrator to which the first orthogonal EMF component in the rotating reference system is coupled as an input, the output of said integrator representing the first component of the flux vector in the rotating coordinate system or, if the coordinate axis is parallel to the flux, the magnitude coordinate of the vector;
 (f) means for deriving a signal related to the frequency of the flux vector from a quantity of the determined flux vector; and
 (g) an angle signal former including a second integrator for forming a second integrator signal, said second integrator having said frequency signal as an input, and said second integration signal being fed back to the computing stage as the angle of rotation of the rotating coordinate system.

* * * * *